Oct. 28, 1969  H. G. BRITTON ET AL  3,475,012
GAS-LIQUID CONTACT UNIT

Filed Nov. 8, 1967  3 Sheets-Sheet 2

INVENTORS
HAROLD GEORGE BRITTON
BILLY HAGUE

BY Cushman, Darby & Cushman
ATTORNEYS

United States Patent Office 3,475,012
Patented Oct. 28, 1969

3,475,012
GAS-LIQUID CONTACT UNIT
Harold George Britton and Billy Hague, Hyde, England, assignors to Imperial Chemical Industries Limited, London, England, a corporation of Great Britain
Filed Nov. 8, 1967, Ser. No. 681,485
Claims priority, application Great Britain, Nov. 8, 1966, 50,029/66
Int. Cl. F28c 1/00
U.S. Cl. 261—112
9 Claims

ABSTRACT OF THE DISCLOSURE

A gas-liquid contact unit consisting of a stack of sheets of an organic polymeric material, each sheet having a plurality of hollows and protuberances moulded in it with respect to a medial plane in the sheet, the hollows and protuberances having the shape of a frustum of a pyramid or cone and the top faces of the protuberances in one sheet registering with the top faces of the protuberances in an adjacent sheet.

This invention relates to a supporting element over which a fluid can flow as a film, the element being suitable for use in cooling towers, effluent treatment apparatus and chemical plant generally.

There are many different types of cooling tower but they can be divided broadly into two main types, the atmospheric open type in which the water is sprayed over a structure open to the atmosphere and the chimney type in which the cooling is carried out within an enclosed space, the cooling medium being supplied by inducing or forced draught. The draught may be horizontal or vertical. The water is cooled by allowing it to pass downwards in such a manner as to present a large surface area to contact with a counter or cross current of a cold-gas, usually air. The air may enter at the bottom of the tower for counter-current cooling or may be caused to enter the side of the tower where cross-current cooling is preferred.

It is apparent that the greater the surface area of a given body of water presented to the cold air, the more efficient will be the cooling of the water, and the attainment of large surface area to volume ratio's for the water has been achieved in different ways. In early forms the water was sprayed on to a system of closely spaced laths and slats inclined to the vertical and placed below the point of distribution of the water and within an uprising current or cross-current of cold air; the water ran down the inclined surface of one set of laths and dripped on to another set which was placed in spaced relationship below the first set and this process was repeated down the tower. The system is known as droplet cooling.

Recently larger surface areas per unit volume of water have been attained by causing the water to flow downwards as a film over continuous supporting elements thus presenting a large surface area to the current of air. Usually the supporting elements have been stacked together to form what is known in the art as a film-flow packing.

For this second and improved method of water cooling known as film-flow cooling it is clear that the greater the surface area available to act as a support for the water film within given space, the more efficient will be the cooling.

This is also a requirement in apparatus for treating liquid effluent and sewage in which the effluent is biologically oxidised by passing it through a filter comprising a stack of supporting elements. In order to ensure a high rate of biological oxidation it is necessary to present a high area of surface per unit volume in the filter. At the same time the heavy growth of micro organisms must not be easily detachable from the surfaces in the filter, otherwise it will block the channels in the filter.

In chemical plant, for example in scrubbers, and absorption towers, supporting elements are often required which allow fluids to flow over them as a film which present a large area of contact to gases which are to be, for example, scrubbed or absorbed.

The present invention is concerned with a supporting element over which a fluid can flow as a film, the element being made from a sheet of an organic polymeric material. Preferably the organic polymeric material will be a thermoplastic material, examples of which are polyvinyl chloride, polymethyl methacrylate, polypropylene, polyethylene, polyvinylidene chloride, copolymers of vinyl chloride and vinyl acetate, polystyrene, oxymethylene polymers and polyesters such as polyethylene terephthalate.

In accordance with the present invention a supporting element comprises a sheet of an organic polymeric material, the sheet having a plurality of hollows and protuberances moulded in it with respect to a medial plane in the sheet, at least some of said hollows and protuberances having the shape of a frustum of a pyramid or a cone.

In this specification the expression "frustum of a pyramid" also includes a body which, though resembling a normal frustum, has a top face having three or more sides or alternatively a top face which is circular, elliptical or any other suitable shape, the form of the top face being independent of the number of sides provided on the bottom face. It will be understood that when the top face does not have the same number of sides as the bottom face then the lateral faces will not be true trapeziums, though substantially they may still resemble trapeziums even though they may not be flat. The hollows and protuberances may also be shapes generated by rotation of curved lines as well as straight lines, e.g. hyperboloids. The lateral face or faces of the shapes may be smooth or have some other surface configuration.

When constructing film-flow packings from the supporting elements of this invention the elements may be stacked so that the top faces of the frustum-like hollows and protuberances register with similar faces on adjacent elements either directly or via an intervening flat sheet or spacing means.

In order that the top faces on the adjacent elements can be brought into face contact then the top faces are conveniently arranged to be in a plane parallel to the medial plane of the sheet. Alternatively the top faces of the protuberances and hollows may be inclined with respect to a plane parallel to the medial plane of the sheet. In this case, in order that corresponding top faces can be arranged in face contact, it will be necessary for corresponding top faces to be inclined in an opposite direction.

In use such film-flow packing is usually arranged so that the medial plane of each supporting element is in a vertical plane.

In a preferred packing comprising a stack of the supporting elements of the present invention such supporting element is attached to another similar supporting element through the medium of an adhesive at, at least, some of the positions where the top faces of the frustum-like hollows and protuberances on one element register with similar faces on an adjacent element. If one mould is used in the production of the supporting elements and if the moulded frustum-like hollows and protuberances, the top faces of which are utilised for adhesion purposes, are arranged in an appropriate manner on the supporting element then the corresponding top faces or adjacent sheets may be brought into a position of abutment simply by inverting one sheet and placing it in contact with the other sheet. A stack of sheets can be built up by inverting alternate sheets. A typical packing was constructed from a stack of rectangular supporting elements made from 0.010 inch thick sheet of a copolymer of vinyl chloride and vinyl acetate measuring 24 inches by 24 inches. The final dimensions of the packing were 24 inches by 24 inches. A structure of about this size is preferred because it is of convenient size and will not be too heavy to be handled by one man. However other considerations such as, for example, distances between supports for the structure may well lead to the use of structures of much larger or smaller size.

Another film-flow packing is constructed by stacking alternate layers of rectangular supporting elements as described herein and rectangular flat sheets of an organic polymeric material. The supporting elements and flat sheets are adhered together at positions where the top faces of the frustum-like protuberances contact the flat sheets and preferably where they register with corresponding top faces on the other side of the flat sheet. In this way packings of any suitable size may be produced.

In another packing the supporting elements are stacked together in a superimposed manner, adjacent elements being held apart by suitable spacing means. In this case the spacing means may comprise spacing pieces of a suitable constructional material which are interposed between and adhered to adjacent elements. Alternatively marginal portions of an element may be adapted to provide spacing portions which register with corresponding spacing portions on an adjacent element. When the spacing means comprise spacing pieces then these are arranged at intervals over the supporting element, conveniently each being interposed between the face of a protuberance on one element and the face of a protuberance on the adjacent element.

In a further packing a stack of the supporting elements, optionally provided with spacing means between adjacent elements or adjacent elements being in abutment, are suspended from a series of needle like supports which extend in horizontal planes and which pass through holes provided at corresponding positions in each supporting element. This packing is particularly suitable for use in chemical plant. Further it is a particularly suitable form of construction when the supporting elements are produced from an organic polymeric material which is not suited to bonding means of an adhesive construction, for example polypropylene.

It should be understood that the moulded hollows and protuberances provided on the supporting element are not solid. In the case of hollows and protuberances having a shape which conforms to a frustum of a cone or pyramid then these will merely comprise a top face and one or more lateral faces each terminating in the medial plane of the sheet. For convenience we refer herein to the edge of a lateral face which is in the medial plane of the sheet as the "lateral edge" of that lateral face. Also herein we refer to the bottom face of the frustum but it will now be realised that this does not exist in the element of this invention and we merely utilise this term to aid the clarity of our description.

In a preferred supporting element the majority of the protuberances and hollows on the supporting element have the same volume and shape.

The supporting element of the present invention may be fabricated from a single sheet or it may be, but preferably it is not, formed from a plurality of superimposed layers which may be of different thicknesses, the separate layers being constructed from the same or different organic polymeric materials.

Preferably the supporting element is fabricated from a single sheet of an organic polymeric material having a Youngs Modulus of the order of $10^5$ lbs. per square inch or more. However when the supporting element is fabricated from a plurality of superimposed layers we prefer that at least one layer of the element is an organic polymeric material having a Youngs Modulus of the order of $10^5$ lbs. per square inch or more, this conveniently being achieved by making such layers from an unplasticised or low plasticised polymeric material, that is a polymeric material having a plasticiser content less than 10 parts per 100 parts of polymer.

We have found that a particularly useful supporting element may be constructed from a copolymer of vinyl chloride and vinyl acetate and having a thickness in the range 0.008 inch to 0.025 inch.

In our supporting element, though at least some of, and preferably the majority of, the hollows and protuberances provided on our sheet will be frustums of pyramids or cones as defined above, the remaining hollows and protuberances may have some other shape.

In a preferred form of our invention neighbouring hollows and/or protuberances have a common lateral edge in the medial plane of the sheet.

Conveniently with the preferred form mentioned in the previous paragraph the majority of the hollows and protuberances provided on the sheet have the shape of a frustum of a pyramid, the bottom face of which has three or four sides. In this case the hollows and protuberances having this shape can be disposed on the sheet in such a manner that each lateral edge of a protuberance coincides, in the medial plane of the sheet, with a lateral edge of a hollow. A particularly suitable supporting element is one in which a lateral face of a protuberance and a lateral face of a neighbouring hollow presents a continuous, preferably substantially smooth, surface to the fluid film.

With the type of element described in the preceding paragraph it is convenient to provide the protuberance and hollows with triangular bottom faces, in which case the protuberances and hollows can be arranged in a series of banks across the element in such a manner that one edge, the base edge, of each bottom face on a protuberance is colinear with one edge, the base edge, of the bottom face of the adjacent protuberance in the same bank. Also the apices opposite to the base edges of the triangular base faces are colinear. In preference the direction of linearity in both cases is at right angles to the direction in which fluid will be caused to flow over the supporting element.

The supporting elements described herein may be produced from flat sheet or alternatively they may be produced by some technique, for example injection moulding, by which the sheet provided with moulded hollows and protuberances can be produced in situ. When the supporting element is produced from flat sheet the hollows and protuberances may be moulded on to the sheet, for example, by a vacuum forming technique, which is well known in the art.

We have already mentioned that, in use, film flow packings made from the elements described herein are usually arranged so that the medial planes of the elements are in a vertical plane. In this case it is important that at the point of entry to the packing and the point of exit from the packing in the direction of fluid flow there should be minimal restriction to the flow of fluid. It is also desirable that at the point of entry and at the point of exit the fluid is evenly distributed over the whole cross section of the packing. With this in mind marginal portions of the supporting element, at positions corresponding to points of entry and points of exit, are adapted to provide uniform distribution of fluid. A particularly desirable supporting element is one in which marginal portions of the sheet element have a plurality of ridges and troughs moulded in it with respect to the medial plane in the sheet. Conveniently in such an element the ridges and troughs are provided with flat base portions which occupy planes parallel to the medial plane of the sheet.

Ideally the base portion of each ridge terminates in a top face of a protuberance having the shape specified above and the base portion of each trough terminates in a top face of a hollow having the shape specified above. When a packing is made with ridges and troughs having the same dimensions then the fluid entering or leaving a packing will be uniformly distributed over the cross section of the packing.

This invention will now be described with reference to the drawings provided in which.

Figure 1:
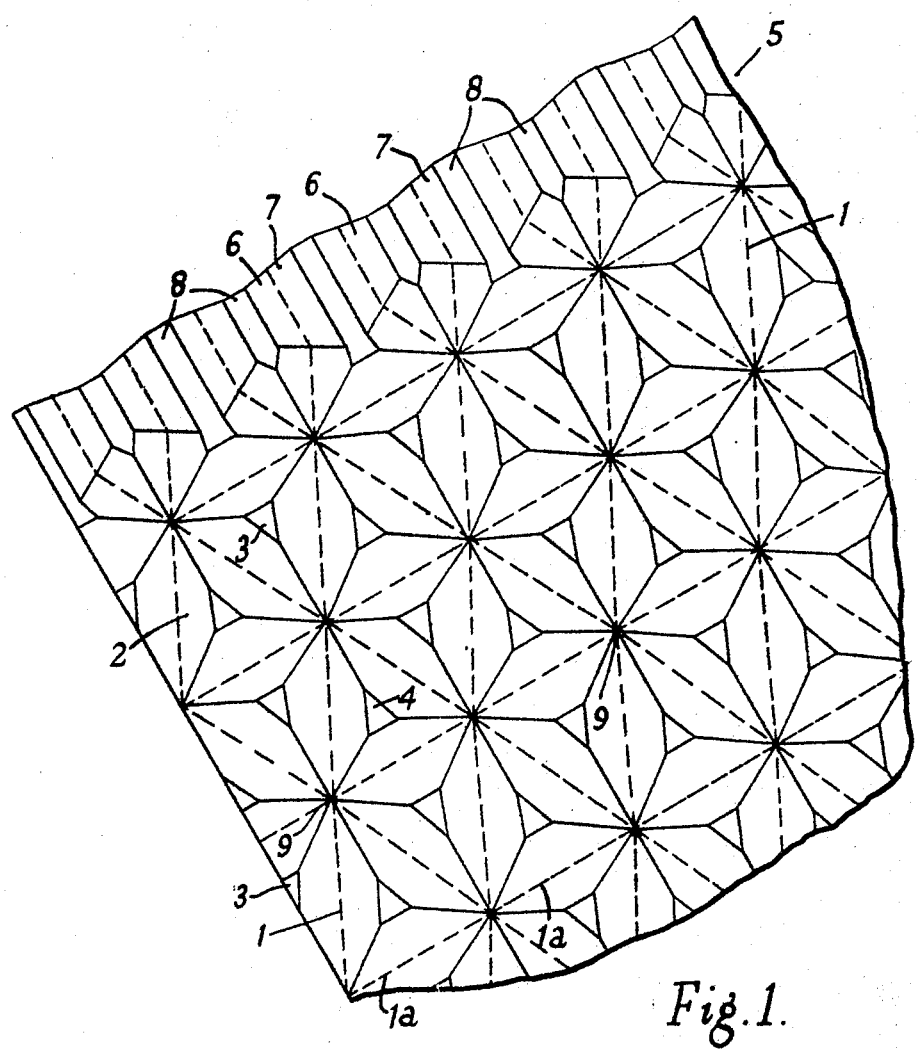
FIGURE 1 shows a fragmentary perspective view of one supporting element in accordance with the present invention.

The supporting elements illustrated in the drawings comprise a sheet of organic polymeric material in which is moulded a plurality of protuberances and hollows. It will be seen the the protuberances and hollows have the same dimension so that when the element is inverted the hollows on one side of the sheet will be seen as protuberances on the other side of the sheet and vice versa. We have referred in the specification to the protuberances and hollows being moulded in the sheet with respect to a medial plane. For clarity in FIGURES 1 and 2 we have indicated lines which lie in the medial plane as dotted lines 1.

Figure 2:
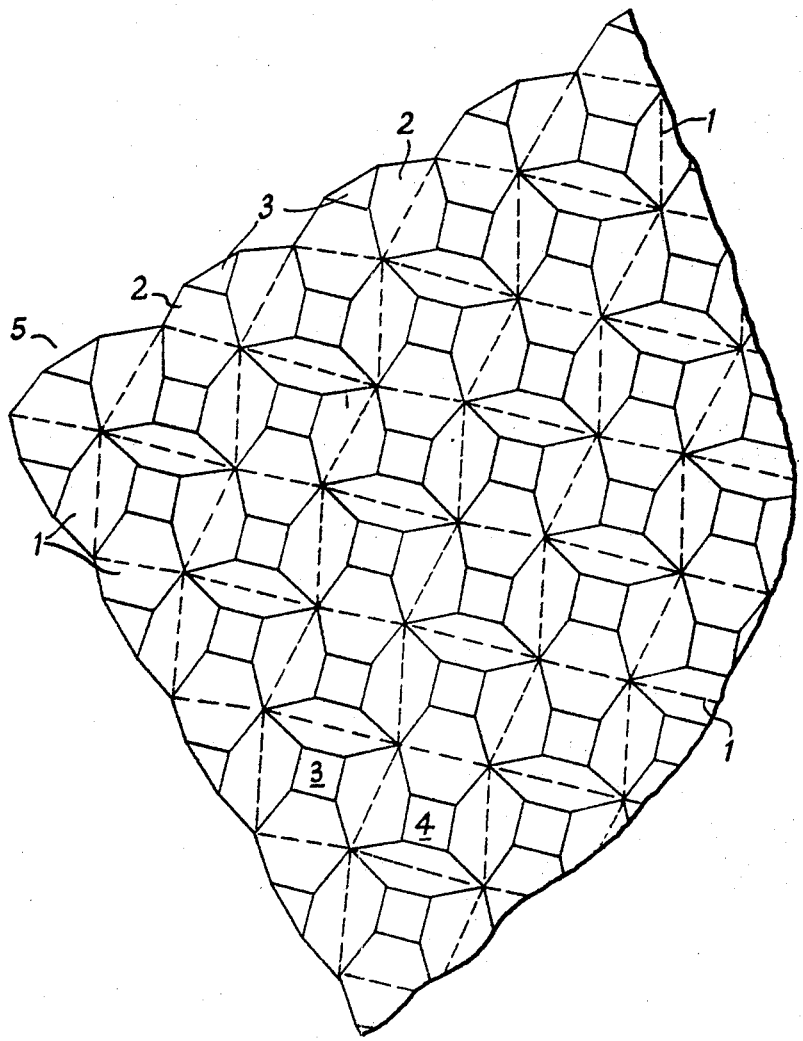
FIGURE 2 shows a fragmentary perspective view of another supporting element in accordance with the present invention.

In FIGURE 1 and FIGURE 2 the moulded hollows and protuberances each comprise a flat top face which may be either triangular (FIGURE 1) or quadrilateral (FIGURE 2) and the lateral faces 2, each of which terminates in what we have referred to in the specification as a "lateral edge" which is in the medial plane of the sheet and which is denoted by numeral 1. Also for clarity we have indicated the top face of a protuberance by numeral 3 and the top face of a hollow by numeral 4.

It will be seen that each lateral edge of a protuberance coincides with a lateral edge of a neighbouring hollow, the lateral faces involved presenting a flat continuous surface to a fluid when it is caused to flow as a film over the surface of the element.

In FIGURE 1 a marginal portion 5, corresponding to either the point of entry to, or the point of exit from, the supporting element, is provided with a plurality of moulded ridges 6 and moulded troughs 7, the axes of which run parallel to one another in the same direction as that in which the fluid will be caused to flow. The ridges and troughs are provided with flat portions 8 which extend in planes parallel to the medial plane of the element, the flat portions being displaced from the medial plane a distance which allows the flat portions to terminate in a top face of either a protuberance (in the case of a ridge) or a hollow (in the case of a trough).

In the element shown in FIGURE 1 the three lateral edges of each protuberance or hollow form a triangle in the medial plane of the sheet. Throughout the specification this triangle has been referred to as the "bottom face." Further it will be seen that the protuberances and hollows are arranged in a series of banks across the supporting element in such a manner that the base 1a of the triangle forming the bottom face of a protuberance will be colinear to the base of the triangle forming the bottom face of another protuberance in the same bank. Also apices 9 of the triangles forming the bottom faces of protuberances in the same bank are colinear. In the supporting element shown in FIGURE 1 the moulded hollows and protuberances have a shape which conforms to a regular frustum of a pyramid, the bottom and top faces of which are isosceles triangles. In a typical element the base edge 1a of the triangular bottom face is 4 inches in length and the vertex angle of this bottom face is 53°8′. Also the base edge of the triangular top face, which occupies a plane parallel to the bottom face, is 1 inch long and the vertex angle of this face is 53°8′. When a protuberance or hollow in this element is viewed in plan and a line is drawn connecting the mid point of the base edge of the bottom face and the apex opposite to this mid point then the line passes through the mid point of the base edge of the triangular top face. Further it also passes through the apex of the top face opposite to the base edge of the top face. The perpendicular height of the triangle forming the bottom face is 4 inches and the perpendicular height of the triangle forming the top face is 1 inch. In the plan view mentioned above the distance between the mid point of the base edge of the top face and the mid point of the base edge of the bottom face is 1 inch.

Figure 3:
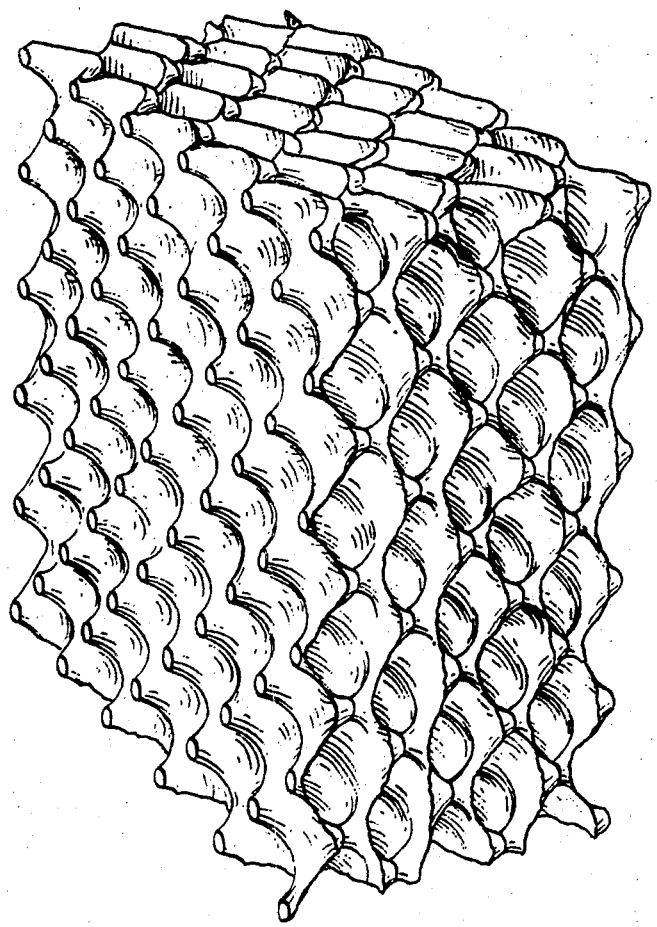
FIGURE 3 is a perspective view of a film flow packing comprising a stack of supporting elements in which the protuberances and hollows moulded in it have the shape of a hyperboloid.

In FIGURE 3 a number of the supporting elements have been stacked one above the other to form a film-flow packing. The top faces of the protuberances on one element in the stack register with the top faces of protuberances of the adjacent element in the stack and adjacent elements are adhered together, through the medium of a suitable adhesive, at positions where the faces are in register.

In use the film-flow packing shown is arranged so that the medial plane of each supporting element in the stack is in a substantially vertical plane.

We claim:

1. A gas-liquid contact unit for apparatus in which a gas stream contacts a liquid flowing as a film over the surfaces of a contact unit, the unit being a stack of supporting elements, each of the supporting elements being a sheet of a rigid organic polymeric material having a plurality of hollows and protuberances moulded in the sheet with respect to a medial plane in the sheet, the improvement comprising:

hollows and protuberances in the sheet having the shape of a frustum of a pyramid or a cone;

at least some of the top faces of the protuberances in one sheet registering with at least some of the top faces of the protuberances in an adjacent sheet, a lateral edge of a lateral face of a hollow or protuberance coinciding with a lateral edge of a lateral face of a neighboring hollow or protuberance, both lateral edges being in the medial plane of the sheet;

the stack of supporting elements being attached together at at least some of the positions where the top faces of the protuberances in adjacent sheets are in register.

2. A gas-liquid contact unit as in claim 1 wherein each of the hollows and protuberances having the shape of a frustum of a pyramid or a cone have a top face which is in a plane parallel to the medial plane of the sheet.

3. A gas-liquid contact unit as in claim 1 wherein adjacent sheets are attached together at each of the positions where the top faces of the protuberances in adjacent sheets are in register.

4. A gas-liquid contact unit as in claim 1 wherein adjacent sheets are attached together at other locations in addition to the said positions where the top faces of the protuberances in adjacent sheets are in register.

5. A gas-liquid contact unit as in claim 1 wherein the major proportion of the hollows and protuberances have the shape of a frustum of a pyramid having a bottom face with three or four sides, a lateral edge of a protuberance coinciding, in the medial plane of the sheet, with a lateral edge of a hollow, the lateral face of a protuberance and the lateral face of a neighbouring hollow presenting a continuous, preferably smooth, surface to the fluid flow.

6. A gas-liquid contact unit as in claim 1 in which each of the protuberances and hollows have a triangular bottom face, the protuberances and hollows being arranged alternately in a series of banks across the element, the base edge of a triangular bottom face of a protuberance in a bank being colinear with the base edges of the bottom faces of the other protuberances in the bank, the apex opposite to the base edge of a triangular bottom face of a protuberance in the bank being colinear with the apices opposite to the base edges of the bottom faces of other protuberances in the bank, the said lines of colinearity being at right angles to the direction in which the liquid will be caused to flow over the supporting element.

7. A gas-liquid contact unit as in claim 1 in which marginal portions of each supporting element, corresponding to the point of entry to and the point of exit from the contact unit are adapted to provide uniform distribution of fluid over the surfaces in the contact unit.

8. A gas-liquid contact unit for apparatus in which a gas stream contacts a liquid flowing as a film over the surfaces of a contact unit, the unit being a stack of supporting elements, each of the supporting elements being a sheet of a rigid organic polymeric material having a plurality of hollows and protuberances moulded in the sheet with respect to a medial plane in the sheet, the improvement comprising:

hollows and protuberances in the sheet having the shape of a hyperboloid;
at least some of the top faces of the protuberances in one sheet registering with at least some of the top faces of the protuberances in an adjacent sheet, a lateral edge of a lateral face of a hollow or protuberance coinciding with a lateral edge of a lateral face of a neighboring hollow or protuberance, both lateral edges being in the medial plane of the sheet;
the stack of supporting elements being attached together at at least some of the positions where the top faces of the protuberances in adjacent sheets are in register.

9. A gas-liquid contact unit for apparatus in which a gas stream contacts a liquid flowing as a film over the surfaces of a contact unit, the unit being a stack of supporting elements, each of the supporting elements being a sheet of a rigid organic polymeric material having a plurality of hollows and protuberances moulded in the sheet with respect to a medial plane in the sheet, the improvement comprising:

hollows and protuberances in the sheet having the shape of a frustum of a pyramid or a cone;
at least some of the top faces of the protuberances in one sheet registering with at least some of the top faces of the protuberances in an adjacent sheet;
the stack of supporting elements being attached together at at least some of the positions where the top faces of the protuberances in adjacent sheets are in register, marginal portions of each supporting element, corresponding to the point of entry to and the point of exit from the contact unit, comprising a plurality of ridges and troughs moulded in the sheet with respect to the medial plane of the sheet, said ridges and said troughs being provided with flat base portions which occupy planes parallel to the medial plane of the sheet, the base portion of a ridge terminating in a top face of a protuberance, the base portion of a trough terminating in a top face of a hollow.

References Cited

UNITED STATES PATENTS

| | | | |
|---|---|---|---|
| 2,917,292 | 12/1959 | Hittrich | 261—112 X |
| 2,977,103 | 3/1961 | Smith et al. | 261—112 X |
| 3,235,234 | 2/1966 | Beaudoin | 261—95 X |
| 3,286,999 | 11/1966 | Takeda | 261—112 X |
| 3,374,993 | 3/1968 | Greer | 261—112 |

OTHER REFERENCES

German printed application 1,058,077, May 1959.

TIM R. MILES, Primary Examiner